Patented Mar. 20, 1951

2,545,977

UNITED STATES PATENT OFFICE 2,545,977

FLAME RESISTANT RUBBER COMPOSITIONS CONTAINING A CHLORINATED WAX AND A METAL CARBONATE

Winthrope C. Smith, Elizabeth, N. J., assignor to Standard Oil Development Company, a corporation of Delaware No Drawing. Application July 13, 1946,
Serial No. 683,416

11 Claims. (Cl. 260—28.5)

1

This invention pertains to rubbery compositions of improved flame resistance and particularly to improved compositions comprising diolefin-isoolefin copolymers and butadiene-acrylonitrile copolymers.

The resistance to burning of rubbery organic materials other than those containing halogen atoms in the molecule such as natural rubber and synthetic rubbers such as are prepared by polymerizing mixtures of a diolefin such as butadiene, isoprene or dimethylbutadiene and an isoolefin such as isobutylene at temperatures below about −40° F. in the presence of Friedel-Crafts catalysts as well as by polymerizing a conjugated diolefin alone or in admixture with a copolymerizable material such as acrylonitrile, styrene, methyl methacrylate and the like in aqueous emulsion is basically very low. This is, of course, a distinct disadvantage in these materials since there are many uses in which rubbery materials are accidentally or unavoidably exposed to flame. Many substances such as selenium, chlorinated rubber, Arochlors (chlorinated aromatic compounds such as chlorinated biphenyl), etc. have been suggested for improving the resistance to burning of rubbery organic materials. While these materials do effect some improvement in the flame resistance of these materials, they have in general been found to be unsatisfactory because relatively large quantities had to be used in order to gain a relatively small improvement in the flame resistance of the material treated and because they were found to exert a deleterious effect upon certain other physical properties of the rubbery materials, particularly the tensile strength.

It is the object of this invention to improve the flame resistance of rubbery organic materials.

It is also the object of this invention to improve the flame resistance of rubbery organic materials without impairing the other properties of said materials.

These and other objects will appear more clearly from the detailed description and claims which follow.

It has now been found that rubbery organic materials other than those containing halogen in the molecule, such as natural rubber as well as synthetic rubbers, such as isoolefin-diolefin low temperature copolymers and emulsion polymers of conjugated diolefins and emulsion copolymers of mixtures of conjugated diolefins with copolymerizable materials containing a single >C=CH$_2$ linkage may be rendered flame resistant without substantially impairing the

2 other properties of the rubbery materials if there is incorporated therein from about 15 to 60 parts by weight of a highly chlorinated paraffin hydrocarbon per 100 parts by weight of the pure gum rubbery material. These chlorinated paraffinic hydrocarbons, which must contain more than 80% of combined chlorine and which may contain as high as 92–95% of combined chlorine, show good compatibility with the rubbery substances and are capable, even when used in amounts of about 25–30 parts per 100 parts of rubbery organic material, of substantially increasing the flame resistance of the rubbery material. Since this increase in flame resistance is achieved without adversely affecting the other properties of the rubbery materials, it is obvious that these materals are vastly superior to such materials as selenium, chlorinated aromatics, chlorinated rubber and the like which have been used previously.

The chlorinated paraffin hydrocarbons which may be used in accordance with the present invention are solid, wax-like or resinous materials containing more than 80% of combined chlorine and up to 92–95% of combined chlorine, preferably from 85 to 90% of combined chlorine. Preferred materials are hexachloroethane or mixtures of hexachloroethane (infinite chlorine/hydrogen ratio) with minor amounts, i. e. up to 20% of lower polychlorinated ethanes, heptachloropropane (chlorine/hydrogen ratio 7), octachloropropane and mixtures thereof or mixtures containing 75 to 90% of octachloropropane and minor amounts of lower polychlorinated propanes. An especially suitable material is a commercial product having an average molecular weight of 311, containing about 89% of chlorine by weight and consisting of about 85% octachloropropane and 15% heptachloropropane. It has a melting range of 110–135° C. and a boiling range of 210–270° C. with no flash or fire point and is soluble in alcohol, ether and most chlorinated solvents but is insoluble in water. Although its chlorine content is high, its hydraulic stability after four hours at 95° C. in 1% solution of Na$_2$CO$_3$ in terms of milligrams of Cl$_2$ per milliliter of sample is 0.5.

The chloro additive compounds are used in the proportion of from about 15 to 60 parts per 100 parts of the pure gum rubbery materials or polymers. About 30% of the flame retardant in accordance with this invention suffice to retard the burning of rubbery materials to such a short period that only an infinitesimally small amount of the rubbery material is consumed before the flame extinguishes itself. In order further to increase the flame resistance of the rubbery material, a neutral filler such as magnesium carbonate, zinc carbonate, a lead carbonate or other metallic carbonate which decomposes in the range of 200–300° C. may also be added to the composition in amounts of up to about 100–150 parts per 100 parts of pure gum rubbery material.

The flameproof compositions in accordance with the present invention contain other ordinary compounding ingredients such as carbon black, fillers, plasticizers, vulcanizing agents, sulfur and the like.

The rubbery organic materials which may be rendered flameproof include natural rubber, the solid, rubbery, vulcanizable copolymers of iso-olefins such as isobutylene with polyolefinic materials, particularly with conjugated diolefins of 4 to 6 carbon atoms such as butadiene, pipery-lene, dimethyl butadiene and the like as described in U. S. Patent No. 2,356,128 or the emulsion polymerizates of conjugated diolefins of 4 to 6 carbon atoms such as butadiene, isoprene, piperylene and dimethyl butadiene or copolymers of such diolefins with compounds containing a single $>C=CH_2$ linkage and capable of copolymerizing with conjugated diolefins in aqueous emulsion such as acrylonitrile, methacrylonitrile, styrene, alpha methyl styrene, para methyl styrene, alpha methyl para methyl styrene, para chloro styrene, acrylic acid esters such as methyl acrylate, methyl methacrylate, ethyl fumarate and unsaturated ketones such as methyl vinyl ketone, methyl isopropenyl ketone and the like.

The following examples are illustrative of the present invention:

*Example 1.*—Samples of natural rubber, a rubbery isobutylene-isoprene low temperature copolymer (GR–I) and an emulsion copolymer of 74 parts of butadiene and 26 parts of acrylonitrile (Perbunan-26) were compounded with fillers, plasticizers, vulcanizing agents and the like and cured. Similar vulcanized compositions were also prepared in which there was provided in addition one or more flame or fire retardants. The several samples were subjected to a flame test as follows. Samples were cut ½" wide, 0.080" thick and 3" long. Bench marks were placed ¼" and 1¼" from one end of the sample. Each sample was held horizontally over a Bunsen burner, using a yellow flame 1" high in such a manner that the top of the flame touched the lower edge of the sample between the end of the sample and the first bench mark. The burner was maintained in this position until the flame of the burning rubber reached the first bench mark whereupon the burner was removed and the time in seconds was recorded for the flame to travel from one bench mark to the other, or the time required for the flame to extinguish itself. The several compositions and the results obtained are summarized in the following table:

*Table*

| Formulae | A | B | C | D | E | F | G | H |
|---|---|---|---|---|---|---|---|---|
| Natural Rubber | 100 | 100 | | | | | | |
| GR–I | | | 100 | 100 | 100 | | | |
| Perbunan-26 | | | | | | 100 | 100 | 100 |
| Zinc Oxide | 5 | 5 | 5 | 5 | 5 | 0.75 | 0.75 | 0.75 |
| Stearic Acid | 3 | 3 | 1 | 1 | 1 | 0.75 | 0.75 | 0.75 |
| Sulfur | 3 | 3 | 2 | 2 | 2 | 2 | 2 | 2 |
| Tetramethylthiuram disulfide | | | 1 | 1 | 1 | | | |
| Benzothiazyl disulfide | | | | | | 1 | 1 | 1 |
| Selenium diethyl dithiocarbonate | | | 1 | 1 | 1 | | | |
| Zinc salt of mercaptobenzothiazole | 0.5 | 0.5 | | | | | | |
| Diortho tolyl guanidine | 0.5 | 0.5 | | | | | | |
| Aroclor | | 20 | | | | | | |
| Selenium | | 30 | | | | | | |
| Chlorinated Rubber | | 30 | | | | | | |
| Hard Clay | 145 | 145 | | | | | | |
| Polychloropropane [1] | | | | | 30 | | | 30 |
| Magnesium Carbonate | | | | 100 | 100 | | 100 | 100 |
| McNamee Clay (soft clay) | | | 100 | | | 100 | | |
| Horizontal Flame Test: | | | | | | | | |
| Time to burn 1" of cured stock in seconds | 47 | | 48 | | | 28 | | |
| Time for flame extinction in seconds [2] | | 40 (¼) | | 53 (¼) | 12 (VS.) | | 15 (VS.) | 6 (VS.) |
| Physics: Tensile—Elongation—Modulus at 200%—Shore 5 sec.: | | | | | | | | |
| 30' cure at 287° F | {1975—400, 1325—62} | 1000—300, 1000—73 | 1530—780, 110—38 | 1360—750, 160—46 | 1340—730, 140—44 | 1430—830, 510—56 | 1690—710, 590—58 | 1850—720, 490—57 |
| 60' cure at 287° F | | | 1630—710, 160—46 | 1550—700, 220—49 | 1500—690, 210—46 | 1590—780, 590—58 | 2170—730, 660—57 | 1200—390, 910—64 |
| 90' cure at 287° F | | | 1540—660, 170—45 | 1360—650, 210—54 | 1190—630, 270—51 | 1390—730, 620—58 | 2390—680, 830—63 | 1170—390, 810—70 |

[1] Polychloropropane used was a mixture of about 85% octachloropropane and 15% heptachloropropane.
[2] (¼) indicates that the flame traveled ¼ of the distance between the 1" bench marks before extinguishing itself. (VS.) indicates a very slight distance burned.
Flame resistance values for samples C, D, E, F, G and H are average values for all three cures.

*Example 2.*—A rubbery isobutylene-isoprene copolymer (GR–I) was compounded according to the following recipe:

| | Parts |
|---|---|
| Isobutylene-isoprene copolymer | 300 |
| Stearic acid | 3 |
| Sulfur | 6 |
| Tetramethyl thiuram disulfide | 3 |
| Selenium diethyl dithiocarbonate | 3 |
| Zinc oxide | 15 |

This mixture was divided into three equal parts and to one, sample X, there was added 15 parts of a mixture of about 85% octachloropropane and 15% heptachloropropane, to another, sample Y, 30 parts of the same mixture and to the third, sample Z, there was added 30 parts of Paroil-170. The latter is a hard, brittle, amber-colored chlorinated paraffin resin having a softening point of over 80° C., a specific gravity of approximately 1.60 and contains about 70% of combined chlorine. The several samples were then cured at 287° F. for 60 minutes and the samples were tested for flame resistance as described in Example 1. Sample Z burned the one inch between the bench marks in 45 seconds while the flame on samples X and Y extinguished itself in 20 and 14 seconds respectively and in the case of both sample X and sample Y, only a very slight portion of the sample burned. These results were the average of two tests on each sample.

The foregoing description contains a limited number of embodiments of the present invention. It will be understood, however, that this invention is not limited to these specific embodiments since numerous variations are possible without departing from the scope of the following claims.

What I claim and desire to secure by Letters Patent is:

1. A composition of matter comprising an inherently combustible, chlorine-free rubbery material chosen from the group consisting of natural rubber, isobutylene-diolefin low temperature copolymers, emulsion homopolymers of conjugated diolefins and emulsion copolymers of mixtures of conjugated diolefins with copolymerizable materials containing a single $>C=CH_2$ linkage and from 15 to 60 parts per 100 parts of pure gum rubbery material of a chlorinated paraffin hydrocarbon having 2 to 3 carbon atoms per molecule and containing from 80 to 95% of combined chlorine based upon the paraffin hydrocarbon and a metal carbonate which decomposes at 200–300° C.

2. A flame resistant composition of matter comprising 100 parts of a rubbery low temperature copolymer of isobutylene and isoprene, 15 to 30 parts of a mixture of about 85% octachloropropane and 15% heptachloropropane, together with a metal carbonate which decomposes at 200–300° C.

3. A vulcanized flame resistant composition of matter consisting essentially of 100 parts of a rubbery low temperature copolymer of isobutylene and isoprene, 5 parts of zinc oxide, 1 part stearic acid, 2 parts sulfur, 1 part tetramethyl thiuram disulfide, 1 part selenium diethyl dithiocarbonate, 30 parts of a mixture of 85% octachloropropane and 15% heptachloropropane, and 100 parts of a magnesium carbonate.

4. A composition of matter according to claim 1 wherein the rubbery material is natural rubber.

5. A composition of matter according to claim 1 wherein the rubbery material is a low temperature copolymer of isobutylene and of a conjugated diolefin of 4 to 6 carbon atoms.

6. A composition of matter according to claim 1 wherein the rubbery material is an emulsion copolymer of a mixture of a conjugated diolefin of 4 to 6 carbon atoms and acrylonitrile.

7. A composition of matter according to claim 1 wherein the rubbery material is an emulsion copolymer of a mixture of butadiene and styrene.

8. A composition of matter according to claim 1 wherein the metal carbonate is magnesium carbonate, which is present in the composition in a concentration of about 100 parts per 100 parts of rubbery material.

9. A composition of matter according to claim 2 wherein the metal carbonate is magnesium carbonate.

10. A composition of matter according to claim 2 wherein the metal carbon is zinc carbonate.

11. A composition of matter according to claim 2 wherein the metal carbonate is lead carbonate.

WINTHROPE C. SMITH.

REFERENCES CITED

The following references are of record in the file of this patent:

UNITED STATES PATENTS

| Number | Name | Date |
|---|---|---|
| 2,138,192 | Ott | Nov. 29, 1938 |
| 2,378,715 | Leatherman | June 19, 1945 |

OTHER REFERENCES

The Rubber Age, October 1942, pp. 32–33.
Chem. and Met. Eng., Sept. 1944, p. 33.
Chemical Industries, vol. 54, #2, Feb. 1944.